UNITED STATES PATENT OFFICE.

ADOLPH SOMMER, OF BERKELEY, CALIFORNIA.

VISCID FATTY COMPOUND.

SPECIFICATION forming part of Letters Patent No. 468,937, dated February 16, 1892.

Application filed July 31, 1886. Serial No. 209,637. (Specimens.)

*To all whom it may concern:*

Be it known that I, ADOLPH SOMMER, a citizen of the United States, residing at Berkeley, in the county of Alameda and State of California, have invented new and useful Neutral Compounds of Fatty Oils with Chloride of Sulphur and a Process of Making the Same; and I do hereby declare that the following is an exact description of the invention, which will enable others skilled in chemical manipulations to prepare and execute the same.

It has been observed by previous investigators that fatty oils, when mixed with chloride of sulphur, ($S_2Cl_2$,) enter into a chemical combination with it, forming new compounds which differ materially from the original oils. This change which oils suffer upon addition of chloride of sulphur was heretofore supposed to be the same in all cases and to consist uniformly in a thickening and ultimately solidifying of the oil; but I find that such uniformity does not exist and that different oils show a marked difference in their behavior toward chloride of sulphur. The solidity of those ultimate compounds seems to depend on or stand in a definite relation to the energy with which an oil is acted upon by chloride of sulphur, being harder the more violent the reaction and softer the milder the reaction between the two reagents.

With regard to the energy with which oils are acted upon by undiluted chloride of sulphur, they may be divided into three groups: First, those which upon being mixed with chloride of sulphur in the cold combine with it almost instantaneously, liberating much heat and yielding hard brittle masses; type, castor-oil. Second, those which upon being mixed with chloride of sulphur in the cold combine with it only after the lapse of some minutes, liberating considerable heat and yielding, according to the proportion of chloride of sulphur, a viscid liquid, a gelatinous semi-solid, or a hard and brittle solid; type, lard-oil. Third, those which upon being mixed with chloride of sulphur in the cold do not take it up completely within several days, but which combine with it gradually when digested with it at an elevated temperature for several hours, yielding compounds which are softer than the original; type, cocoanut-oil. There are, however, many oils which stand intermediate between these groups, so that a strict classification is impossible.

It is the second class of oils—namely, those which upon being mixed with chloride of sulphur in the cold combine with it only after the lapse of some minutes—to which my process, as described below, is especially applicable. Those of this class to which I have special reference are lard-oil, fish-oil, olive-oil, cotton-seed oil, groundnut-oil, colza-oil, mustard-seed oil. Having further found that a low temperature tends to greatly retard the reaction, I make use of this agency in order to secure sufficient time to thoroughly mix the two substances before they unite and to avoid in this manner a stronger reaction in one portion of the mixture than in another.

In order to produce these compounds, I proceed in the following manner: The oil which is to be combined with chloride of sulphur is by mechanical means or by heating, or both, carefully freed from any water which may have been mixed with it. It is then cooled to a temperature near or below zero degree centigrade, and while still immersed in the cooling medium it is mixed with the entire amount of chloride of sulphur which is to be added and which has preferably been cooled also. A complete intermixture is brought about by strong agitation, which is continued until the combination has been effected. When the smell of chloride of sulphur has grown faint, indicating that the greater portion of it has entered into combination with the oil, the mixture is removed from the cooling medium and allowed to stand at rest at the prevailing temperature for several hours. If, however, it is inconvenient to cool the oil to so low a temperature, as stated above, I effect the same purpose by surrounding the vessel containing the oil, of which in this case not more than two or three gallons should be treated at one time, with cold water, (below 15° centigrade.) After the oil has become cold I add to it a portion of the chloride of sulphur, preferably one-half, and incorporate the two by stirring. When the combination has taken place, I allow the mixture to stand until it has again become cold and then add the remaining portion of the chloride of sulphur, stirring the mixture, as before. After having stood at rest for several hours it is, like the one prepared near or below zero degree centigrade, ready for further treatment. The quantity of chloride of sulphur which I combine in this manner with an oil depends on the purpose to which the finished compound is to be applied as well as upon the nature of the oil. When the object is to obtain from an oil—as that of cotton-seed—a highly-viscid and yet fluid compound, I generally use about fourteen parts of chloride of sulphur to one hundred parts of oil, while when a solid compound is desired from the same oil I take about twenty parts of chloside of sulphur to one hundred parts of oil. In the reaction between oil and chloride of sulphur there is formed a little chlorhydric acid, the quantity of which differs with the proportion of chloride of sulphur added, as well as with the oil employed; but in the case of the viscid-fluid cotton-seed-oil compound mentioned above it amounts to about one-quarter of one per cent. of the weight of the compound. This acid, if left in the compound, has an injurious effect upon it, and it is therefore necessary to remove the same.

The removal of the acid is effected by the addition of one or a mixture of the following substances, (but other bodies which are analogous to them may be substituted for these): the oxide of calcium or magnesium in the form of a very fine powder; the hydroxide of sodium or potassium or ammonium in a concentrated solution or that of calcium in powder; the carbonate of calcium or magnesium in a very fine powder, the crystallized carbonate of sodium in a coarse powder, or the carbonate of sodium or potassium or ammonium in a concentrated solution; the soaps of sodium, potassium, calcium, magnesium, or aluminum in powder or in an oily solution. With the exception of the crystallized carbonate of sodium, I add any one or a mixture of these substances to the acid compound at the ordinary temperature, incorporate the same thoroughly, and allow the mixture to stand undisturbed at the ordinary or a slightly-elevated temperature (not exceeding 60° centigrade) to deposit the heavier solid particles. After the compound has stood for several days, or longer, if possible, the upper portion is decanted or drawn off from the sediment; but beyond this voluntary separation no effort is made to remove any excess of the neutralizing agent nor any of the chlorhydric-acid derivatives of the neutralizing agent resulting from the neutralization of the acid. When the crystallized carbonate of sodium is chosen for this purpose, I add it in the state of a coarse powder or granulated salt to the acid compound and heat the mixture with constant stirring, preferably in an oil bath, to about 115° centigrade. The crystallized carbonate of sodium or a concentrated solution of the hydroxide of sodium are generally preferred by me for the purpose of neutralizing the free chlorhydric acid. The quantity of these substances which is necessary for the neutralization of the chlorhydric acid is in most cases the chemical equivalent of the weight of the chlorhydric acid present. This, in the presence of one-quarter of one per cent. of chlorhydric acid, is for crystallized carbonate of sodium two per cent. and for hydroxide of sodium three-tenths of one per cent. When, however, the proportion of the chloride of sulphur is such as to convert the oil into a very thick liquid or a solid, I accomplish the same result—namely, that of obtaining a neutral compound—by adding to the oil after it has been dehydrated, but before it is mixed with the chloride of sulphur, a small amount of dry calcium hydrate or some analogous substance in the manner as described in another application, Serial No. 227,575, filed February 14, 1887, (entitled "A process of making neutral compounds of fats and fatty oils with chloride of sulphur.") In every other respect, but the omission of the treatment with a neutralizing agent after the incorporation of the chloride of sulphur, the treatment of the oil remains the same.

I am aware that compounds of chloride of sulphur with oils have been prepared by others; but these compounds have always been made at the ordinary temperature, and no one has, to my knowledge, ever resorted to cooling the ingredients previous to their combination, so as to retard the reaction and to prevent the injurious effect of a high temperature upon the mixture.

I am also aware that similar compounds prepared from chloride of sulphur, bastard gum, linseed-oil, and vaseline are freed from the adhering chlorhydric acid by first finely granulating, then washing them in either pure or slightly alkaline water, and finally draining, pressing, and drying them in order to remove all traces of water and alkaline salts; but I have no knowledge of any one ever having removed the chlorhydric acid from compounds of chloride of sulphur with fatty oils by incorporating with them a neutralizing agent in a concentrated form, with the result that a larger or smaller portion of the neutralizing agent or of its chloride, oxychloride, or chlorhydride produced by the neutralization of the chlorhydric acid remains in suspension or in solution in the finished compound.

I claim—

1. The improvement in combining fatty oils with chloride of sulphur, consisting in cooling the oil to a temperature of about or below 15° centigrade previous to the addition of the chloride of sulphur, substantially as described.

2. The neutral viscid compounds of chloride of sulphur with fatty oils, holding in suspension or in solution an inorganic neutralizing agent or its chlorhydric acid derivative, or both, substantially as described.

ADOLPH SOMMER.

Witnesses:
H. ROYER,
L. F. CLAR.